United States Patent [19]

Poirier

[11] 4,213,123

[45] Jul. 15, 1980

[54] INTEGRAL ENABLE-DISABLE MEANS FOR GUIDED WAVE RADAR INTRUSION DETECTOR SYSTEM PORTALS

[75] Inventor: J. Leon Poirier, Chelmsford, Mass.

[73] Assignee: The United States of America as represented by the Secretary of the Air Force, Washington, D.C.

[21] Appl. No.: 10,093

[22] Filed: Feb. 7, 1979

[51] Int. Cl.² .............................................. G08B 13/18
[52] U.S. Cl. ................................... 340/552; 343/5 PD
[58] Field of Search ....................... 340/552; 343/5 PD

[56] References Cited

U.S. PATENT DOCUMENTS

| 4,091,367 | 5/1978 | Harman | 343/5 PD X |
| 4,135,185 | 1/1979 | Rotman et al. | 340/552 |

*Primary Examiner*—T. H. Tubbesing

*Attorney, Agent, or Firm*—Joseph E. Rusz; Willard R. Matthews

[57] ABSTRACT

The intrusion detection capability of a guided wave radar intrusion detection system is selectively disabled in certain areas, such as gates or portals to permit ingress and egress of personnel and vehicles without affecting overall system performance and without requiring an independent detection system. This is realized by means of an integral system portal enable-disable device. Guided wave radar intrusion detection systems employ two parallel leaky transmission lines, one transmitting and the other receiving radar signals. Violation of the area between the leaky transmission lines by an intruder results in a signal that indicates the occurrence and its location. Gate areas are remotely enabled or disabled by a switching circuit that switches a segment of non-radiating transmission line into or out of the transmitting leaky transmission line in each selected gate region.

6 Claims, 4 Drawing Figures

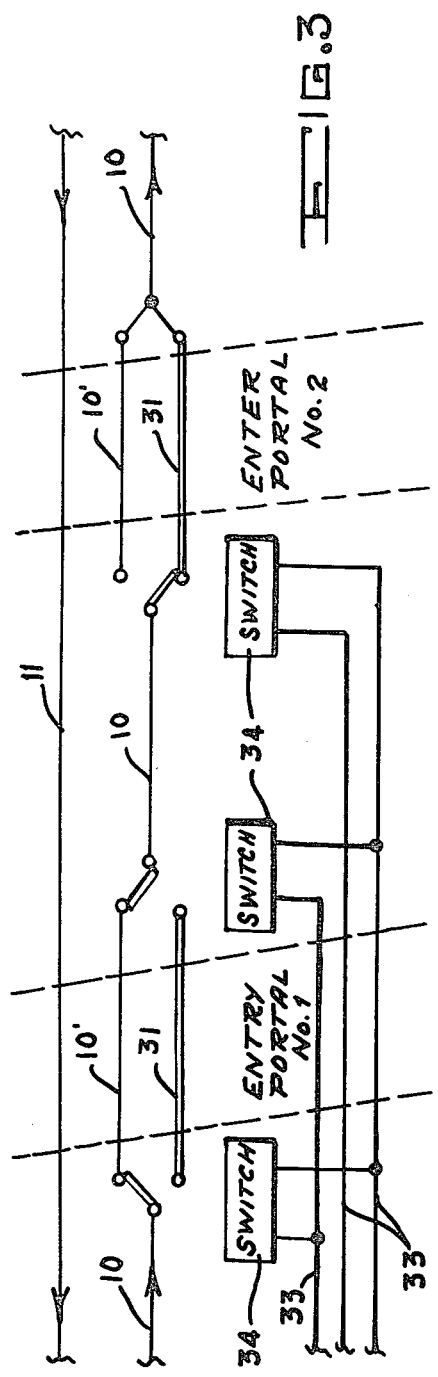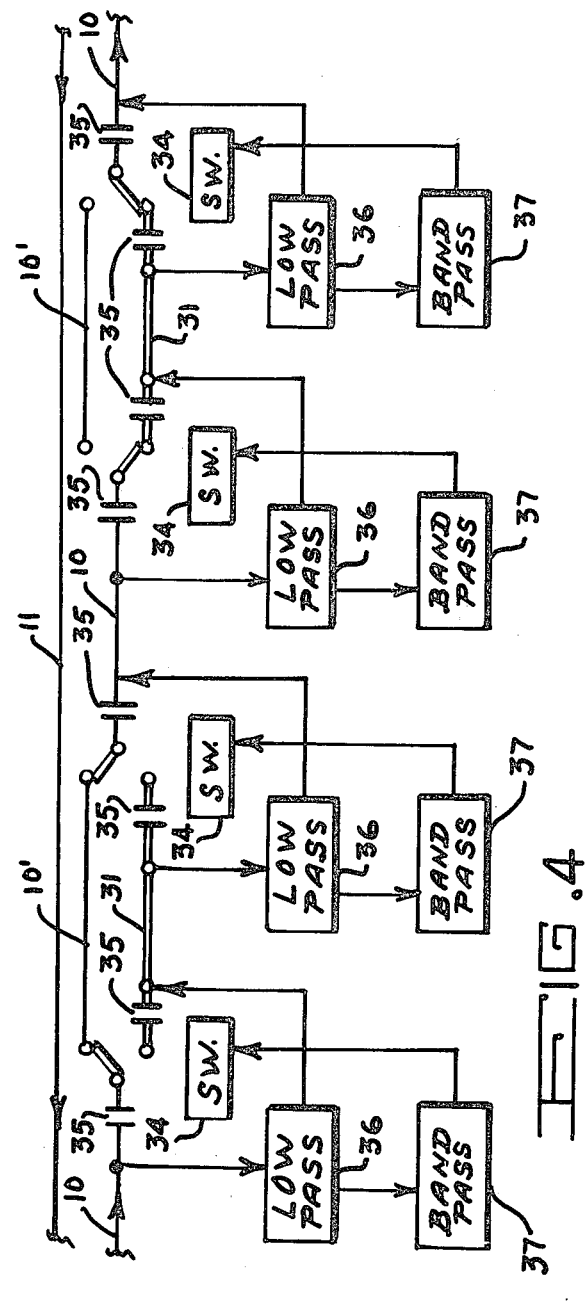

INTEGRAL ENABLE-DISABLE MEANS FOR GUIDED WAVE RADAR INTRUSION DETECTOR SYSTEM PORTALS

STATEMENT OF GOVERNMENT INTEREST

The invention described herein may be manufactured and used by or for the Government for governmental purposes without the payment of any royalty thereon.

BACKGROUND OF THE INVENTION

This invention relates to guided wave radar intrusion detection systems and in particular to an integral enable-disable switching means that permits ingress and egress through selected portions of such a system without affecting overall system integrity and without requiring auxilliary intrusion detection devices.

Over the past decade, there has been a growing effort expended on the development of intrusion detection systems for outdoor use and a variety of systems have been developed for this purpose. A number of sensors, already developed or now under evaluation, monitor changes in either acoustic, optical, infrared, electromagnetic or seismic information when an intruder enters a particular zone of detection and declare the presence of an intruder when one or more of these changes exceeds a certain threshold. Unfortunately, it is not often possible to provide reliable detection under all weather conditions, mainly because of the inability of most systems to accommodate the effects of the environment in the vicinity of the sensor; that is, the detectable characteristics of the intruder too closely resemble the characteristics of either environmental effects or normal man-made interference. These disadvantages have been largely overcome by recently developed guided wave radar intrusion detection systems. A system of this type called Guided Intrusion Detection And Ranging (GUIDAR) is marketed commercially by Computing Device Company, a division of Control Data Canada Ltd.

The GUIDAR concept is based on the properties of so-called leaky (or ported) coaxial cables, in which a portion of the electromagnetic (EM) energy travelling within the cable is allowed to escape in a controlled fashion, creating a travelling EM wave external to but within the vicinity of the cable. Two such cables, spaced a few feet apart, are laid around the perimeter of a securred area. A pulse of EM energy is transmitted down one of the cables, a portion of the energy "leaks out" and irradiates the detection zone. An intruder crossing the zone disturbs the field, causing a reflected wave to couple into the second (receive) cable. The time between the onset of the transmit pulse and the return of the reflected signal provides a measure of the intruder's position.

Although systems of this type represent an improvement over other state-of-the-art intrusion detection systems, they have been found to have problems when the protected zone must be interrupted by one or more entry portals. Currently, it is necessary to permanently disable that area of the system in order to prevent large targets like vehicles from overloading the system processor and producing false alarms in widely separated locations. The approach to the problem of course requires an independent intrusion sensor which is switched on when the entry portal is not in use.

There currently exists therefore, the need for means whereby intruder detection at the portals of guided wave radar intrusion detector systems can be selectively enabled and disabled without permanently disabling the portal section and without requiring an auxiliary detection system. the present invention is directed toward satisfying that need.

SUMMARY OF THE INVENTION

The invention comprehends an improved guided wave radar intrusion detection system having integrated means for selectively enabling and disabling intrusion detection capabilities at one or more system portals. The guided wave radar intrusion detection system utilizes two parallel leaky transmission lines (one transmitting and the other receiving radar signals) that encompass a securred area. Control area intrusion detection capability is selectively disabled by switching a portal traversing segment of non-radiating transmission line into the transmitting leaky transmission line. Switching can be local and mechanical or remotely operated by tone actuated solid state r.f. switches.

It is a principal object of the invention to provide new and improved means for enabling and disabling the intrusion detection capability of portals in a guided wave radar intrusion detection system.

It is another object of the invention to provide an integral remotely operated means for enabling and disabling the intrusion detection capabilities of selected portals in a guided wave radar intrusion detection system.

It is another object of the invention to provide in a guided wave radar intrusion detection system a portal intrusion detection enable-disable device that elemitnates false signals due to system processor overload and that does not require a separate detection system.

These together with other objects, features and advantages of the invention will become more readily apparent from the following detailed description when taken in conjunction with the illustrative embodiment in the accompanying drawings.

DESCRIPTION OF THE DRAWINGS

FIG. 3 illustrates one specific embodiment of the integral portal enable-disable device of the invention; and FIG. 4 illustrates another specific embodiment of the integral portal enable-disable device of the invention.

DETAILED DESCRIPTION OF THE PREFERRED EMBODIMENTS

Figure 1:
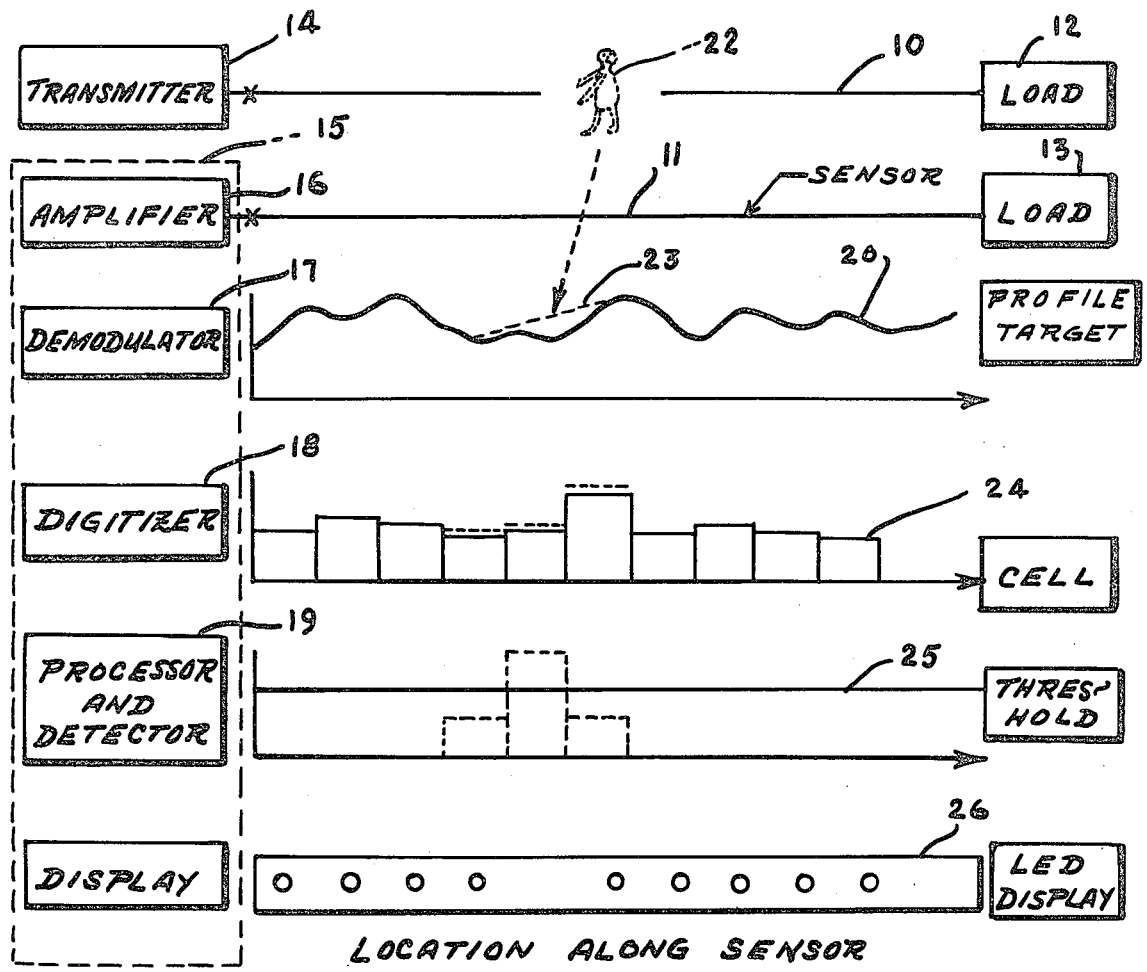
FIG. 1 is a generalized block diagram illustrating the detection process of a guided wave radar intrusion detection system.

The invention permits the implementation of integral switchable entry portals in guided wave radar intrusion detection systems such as the GUIDAR intruder detection system referred above. The intrusion detection system is a guided wave radar system that uses a pair of leaky coaxial cables as perimeter sensors. Typically these cables are two miles long and spaced five feet apart. One of the cables is the transmitting sensor, the other the receiving sensor. A generalized block diagram of the detection process of this type device is presented in FIG. 1. The sensor is shown as two-cables 10, 11 terminating in radio frequency loads 12,13. One cable 10 is connected to a transmitter 14 which injects short bursts of RF energy into the sensor. The second cable 11 is connected to the receiver 15 which includes amplifier 16, demodulator 17, digitizer 18 and processor and detector 19 where the return signal after demodulation by demodulator 17 appears typically as the upper solid waveform 20. This waveform essentially depicts the cumulative effect of reflections coupled from the transmit to the receive cable at every point along the sensor and is therefore a profile of return coupled power versus distance along the sensor. The advent of an intruder 22 at some point along the sensor causes a change in coupled power at that point, thereby causing the received waveform to be modified according to the dashed line 23 shown. This change in profile is detected by first digitizing the received waveform by digitizer 18 and dividing it into a number of range cells, each of which is related to a particular point along the sensor as illustrated by curve 24. A microprocessor 19 continuously monitors the status of each range cell; any change in status that exceeds a predetermined threshold shown by curve 25 is declared to be a target and the operator is alerted via a sonic alarm and light display 26.

When, in the past, the perimeter of such a system was required to be interrupted by an entry portal, it was necessary to permanently disable that area of the system to prevent large targets like vehicles from producing false alarms in widely separated locations. In order to assure security, it was also necessary to provide an independent intrusion sensor which could be switched on when the portal was not in use.

The present invention overcomes these problems by providing an integral device that can be switched into and out of selected portal regions to accommodate scheduled use of gates and other portals without degrading system performance and without requiring auxilliary detection systems.

Figure 2:
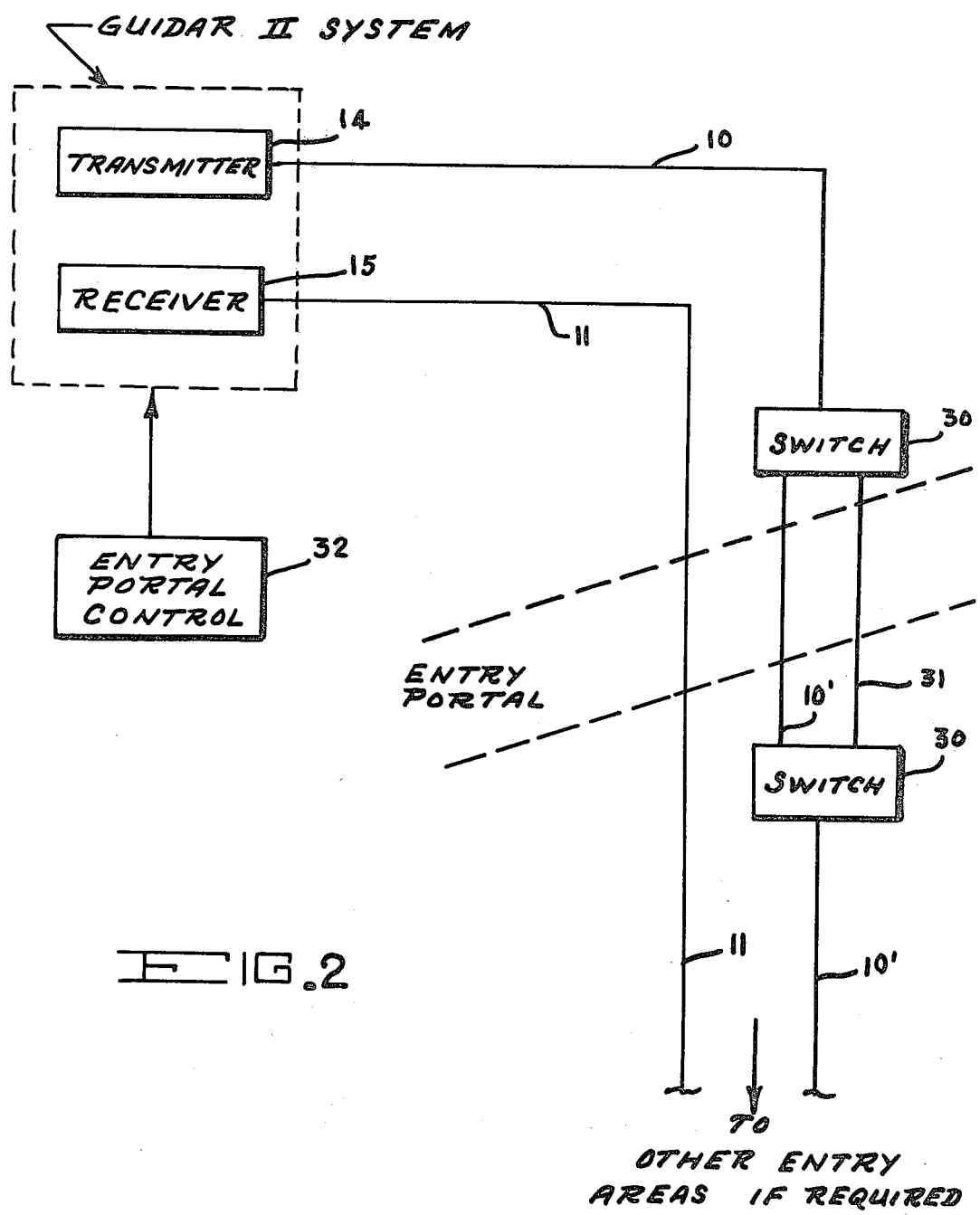
FIG. 2 is a block diagram illustrating the basic concept of the integral portal enable-diable device of the invention.

Referring now to FIG. 2, there is shown in block diagram form a guided wave radar intrusion detection system consisting of transmitter 14, receiver 15, transmitting leaky transmission line 10 and receivisng leaky transmission line 11. Basically, the invention comprehends replacing a section of transmitting leaky transmission line 10' with a substantially equal section of non-radiating transmission line 31 in the region that traverses the entry portal. This is accomplished by SPDT switches 30 which may be manually operated at the site or remotely operated by an entry portal control 32. Remote control of the switches can be accomplished by the use of conventional solid state switches 34 operated by external DC control lines 33 as illustrated by FIG. 3. FIG. 3 also illustrates at entry portal No. 2 that switching can be accomplished by a single switch located on the transmitter side of the portal with line segments 10' and 31 being permanently connected on the distal side of the entry portal. Although this arrangement eliminates a switch, it slightly degrades overall system performances.

The switching power can also be delivered along the leaky transmission lines as a audio tone control voltage as shown by FIG. 4. The audio tone system would allow the control of multiple entry areas from a control location without external wires. This is accomplished by the circuit of FIG. 4 which includes low pass filters 36 and band pass filters 37. D.C. blocking capacitors 35 are employed to divert the d.c. switching power and the d.c. line amplifier power around the contacts of switches 34.

While the invention has been described in its presently preferred embodiments, it is understood that the words which have been used are words of description rather than words of limitation and that changes with the preview of the appended claims may be made without departing from the scope and spirit of the invention in its broader aspects.

What is claimed is:

1. In a guided wave radar intrusion detection system having first and second juxtaposed leaky transmission lines with means for transmitting radar signals along said first first leaky transmission line and receiving radar signals received by said second leaky transmission line, the improvement residing in an integral portal intrusion detection enabling-disabling device, said portal intrusion detection enabling-disabling device comprising, at each selected portal,
    a segment of non-radiating transmission line traversing the portal in proximate paralled relationship to said first leaky transmission line, and
    a switching means for selectively switching said segment of non-radiating transmission line and a substantially equal length of said first leaky transmission line alternately into and out of said first leaky transmission line.

2. In a guided wave radar intrusion detection system, the portal intrusion detection enabling-disabling device defined in claim 1 wherein said switching means comprises a single pole double throw switch between the portal and said means for transmitting radar signals and, on the distal side of said portal, means connecting the end of said non-radiating transmission line segment and said leaky transmission line.

3. In a guided wave radar intrusion detection system the portal intrusion detection enabling-disabling device defined in claim 1 wherein said switching means comprises a single pole double throw switch on each side of the portal.

4. In a guided wave radar intrusion detection system the portal intrusion detection enabling-disabling device defined in claim 3 wherein said switches are solid state r.f. switches remotely controlled and powered by means of an auxilliary external control circuit.

5. In a guided wave radar intrusion detection system the portal intrusion detection enabling-disabling device defined in claim 3 wherein said switches are solid state r.f switches individually remotely controlled by means of tone signals transmitted by a control circuit comprising said first leaky transmission line, said non-radiating transmission line segments and low pass and band pass filter means.

6. In a guided wave radar intrusion detection system the portal intrusion detection enabling-disabling device defined in claim 3 wherein said first and second leaky transmission lines are ported coaxial cables.

* * * * *